US007283467B2

(12) United States Patent
Rajsic et al.

(10) Patent No.: US 7,283,467 B2
(45) Date of Patent: Oct. 16, 2007

(54) PROCEDURES FOR IMPROVING CALL ROUTING IN PNNI NETWORKS

(75) Inventors: Carl Rajsic, Nepean (CA); Maged Edward Shaker, Ottawa (CA)

(73) Assignee: Alcatel Canada Inc., Kanata, ON (CA)

( * ) Notice: Subject to any disclaimer, the term of this patent is extended or adjusted under 35 U.S.C. 154(b) by 1002 days.

(21) Appl. No.: 10/315,996

(22) Filed: Dec. 11, 2002

(65) Prior Publication Data

US 2004/0114508 A1    Jun. 17, 2004

(51) Int. Cl.
*G01R 31/08*    (2006.01)
*H04L 12/28*    (2006.01)
*H04J 3/16*     (2006.01)
*G06F 15/173*   (2006.01)

(52) U.S. Cl. .............. 370/228; 370/237; 370/395.2; 370/465; 709/239

(58) Field of Classification Search ........ 370/216–218, 370/225, 237, 395.1, 395.2, 351, 395.32
See application file for complete search history.

(56) References Cited

U.S. PATENT DOCUMENTS

| | | | | |
|---|---|---|---|---|
| 5,831,975 A | * | 11/1998 | Chen et al. ................. | 370/256 |
| 6,111,881 A | * | 8/2000  | Soncodi .................... | 370/395.32 |
| 6,122,753 A | * | 9/2000  | Masuo et al. .............. | 714/4 |
| 6,333,918 B1 | * | 12/2001 | Hummel ..................... | 370/238 |
| 6,778,535 B1 | * | 8/2004  | Ash et al. ................. | 370/395.21 |
| 7,002,906 B1 | * | 2/2006  | Basso et al. ............... | 370/218 |

2001/0010681 A1    8/2001 McAllister et al.

OTHER PUBLICATIONS

"Private Network-Network Interface Specification Version 1.1 (PNNI 1.1)", Apr. 2002, The ATM Forum Technical Committee, pp. 1-77, XP002413847.
"Adaptive Crankback Schemes For Hierarchical QoS routing in ATM networks", Chang, BJ et al., Mar. 15, 2002, Computer Communications, Elsevier Science Publishers BV, pp. 534-543, ISSN: 0140-3664, XP 004332678.
"Approaches to Link-State Alternate Path Routing in Connection-Oriented Networks", Sivabalan M, et al., Jul. 19, 1998, IEEE, pp. 92-100, XP010291773, ISBN: 0-8186-8566-2.

* cited by examiner

*Primary Examiner*—Chau Nguyen
*Assistant Examiner*—Nittaya Juntima
(74) *Attorney, Agent, or Firm*—Marks & Clerk; S. Mark Budd

(57) ABSTRACT

A method and system for improving call routing in a PNNI network using crankback messaging. A destination logical group node (LGN) blocked crankback procedure is used by entry border nodes, in the event of a failed connection attempt, to instruct preceding routing capable nodes to route the connection over another link. If the entry border node is in the lowest level peer group a Succeeding End Blocked (SEB) crankback message is sent to the preceding routing-capable node. If the entry border node is not in the lowest level peer group, a destination LGN blocked crankback message is sent to the preceding routing-capable node wherein the message has special information to signal the routing node that the link into the destination LGN is blocked.

20 Claims, 2 Drawing Sheets

PROCEDURES FOR IMPROVING CALL ROUTING IN PNNI NETWORKS

FIELD OF THE INVENTION

The present invention relates to the field of data communications networks, and more particularly to a method of routing call connections in such networks.

BACKGROUND

Switching systems (also referred to as "switching networks") route data through and among data communications networks. Switching systems typically comprise a plurality of switches and clusters of switches ("nodes") that provide data communications paths among elements of data communications networks.

The "topology" of a switching network refers to the particular arrangement and interconnections (both physical and logical) of the nodes of a switching network. Knowledge of the topology of a switching network is used to compute communications paths through the network.

For switching systems that comprise a small number of individual switches, the topology is fairly straightforward and can be described by identifying the individual nodes in the system and the communications links between them. For larger and more complex networks, however, the amount of data needed to identify all links between all nodes of the network can be quite extensive.

A number of approaches have been proposed to reduce the amount of information needed to describe the topology of complex switching networks. One approach involves grouping physical nodes into groups ("peer groups") that are viewed as individual logical nodes ("logical group nodes") having characteristics that comprise an aggregation of the characteristics of the individual nodes within the group. Such logical group nodes may be further grouped with other physical and/or logical nodes to form successively higher level peer groups, creating a hierarchy of peer groups and logical group nodes.

One example of a network that allows physical nodes to be grouped into levels of logical groups of nodes is a "PNNI" network. PNNI, which stands for either "Private Network Node Interface" or "Private Network Network Interface," is a routing and signaling protocol developed by the ATM Forum. The PNNI routing protocol is used to distribute topology information between switches and clusters of switches within a private ATM switching network. The PNNI signaling protocol is used to set up data connections within the PNNI network, via signaling call setup messages through the network.

A PNNI network is a network that utilizes the PNNI routing and signaling protocol. Within the PNNI routing protocol a Logical Group Node (LGN) is an abstract representation of a lower level Peer Group (PG) as a single point for the purposes of operating at one level of the PNNI routing hierarchy. Logical Group Nodes are created in a switching system via configuration and become operational dynamically as a result of the PNNI routing protocol behavior. Within the PNNI routing hierarchy a lowest level node is an abstraction representing a single instance of the PNNI routing protocol. Lowest level nodes are created in a switching system via configuration and are always operational. An LGN or a lowest level node is also known as a logical node or a node for the purpose of the present application. Other terms which will be used in this application are an entry border node which is a node at which a call setup message enters a peer group and an exit border node which is a node from which a call setup message leaves a peer group.

The PNNI routing protocol is used typically in ATM products to distribute information about changing network topology and network resources among a group of associated switches. Topology information is organized and distributed in a hierarchical fashion, or a flat single peer group, depending on the network topology. Hierarchy allows networks to scale their topologies to a very large number of nodes. The PNNI implementation provides the required support to exist and participate in the multilevel hierarchical network.

In a hierarchical network, nodes in the PNNI routing domain are grouped into peer groups. Nodes in the same peer group elect a peer group leader. The peer group leader is responsible for activating a logical group node (LGN) at the second level of hierarchy as well as existing as the logical node in the lowest level. The newly activated LGN exchanges PNNI routing information with other neighbor LGNs at the second level of hierarchy. The neighbor LGNs are other LGNs that other lower level PGLs instantiated from adjacent peer groups. In addition to exchanging information the LGN propagates information from higher levels down into the lower level peer group via the PGL that instantiated it. This is so that all nodes in the lower level peer group have the same information about the other LGNs in the higher level peer group where the activated LGN exists. From the hierarchical topology information gathered by a node, routing tables are created and used by the switches to route calls using the PNNI signaling protocol. PNNI networks and hierarchical groupings are described in co-pending U.S. application publication 20040085961 filed Nov. 1, 2002 entitled "Method for Advertising Reachable Address Information in a Network" the contents of which are incorporated herein by reference.

Routing tables are used by a node routing a call to create a Designated Transit List (DTL), which is a source route list to a destination node where a call is to be forwarded. A DTL is a list of PNNI nodes and port IDs that describe the path through a PNNI network on which a user call setup message is to proceed. In a hierarchical network, a stack of DTLs is used to represent the route to be taken at the different levels of hierarchy in the network. DTLs on the stack are added (pushed) by the DTL originator and entry border nodes and removed (popped) by exit border nodes along the route of the call, The DTL stack is sent in the setup message to set up the call using the PNNI signaling protocol.

In the present application reference is made to a crankback feature. The PNNI signaling protocol, as developed by the ATM Forum, supports crankback. In PNNI crankback a call, failing to set up at a certain node, is regressed to the node that last pushed DTLs onto the DTL stack which can be a DTL originator or entry border node. There is enough information in the crankback to indicate where the call was blocked. The information in the crankback provides the type of blocking (node, link, succeeding end of the link), and the location of the blocking (node Id for a node blocking type, or preceding and succeeding node Ids at both ends of a link for a link blocking type). According to the crankback procedures in the PNNI specification, an entry border node failing to route a call within its peer group, should crankback the call to the higher level with a "node blocked" or "link blocked" crankback message. Thus, an entry border node in the last peer group (i.e. an entry border node routing to a lowest level destination physical node), can generate a link blocked crankback message, having a null succeeding node Id (all zeros), at a higher level if the entry border node fails to route the call to the destination node. This would result in the blocking of the destination LGN, hence stopping further re-routing attempts from other routing-capable entry border nodes and/or the DTL originator towards the destination, even if other valid paths may exist. The problem manifests itself when there are multiple entry border nodes into the destination LGN's peer group for a call and the selected entry border node cannot find a route to the destination node even though one would have existed had the call chosen a different entry border node from which to enter the destination LGN's peer group. This situation typically occurs when a call selects a specific entry border node in the destination LGN's peer group, and there are no paths available from that entry border node (for example due to bandwidth shortage) to the actual physical destination node.

The limitation of the crankback provisions as set out in the PNNI protocol are illustrated in the following examples.

Referring to FIG. 1, a call is made from A.1 to C.3 following top-most level DTL (A-B-C). In peer group B, B.2 the exit border node forwards the call to C.1. Due to insufficient bandwidth on link C.1-C.3, entry border node C.1 must crankback the call. According to prior art PNNI crankback procedures, node C.1 generates a link blocked crankback at the second level (C, 0). This crankback is propagated in peer group B back to A.1, the DTL originator. A.1 finds that the destination peer group is blocked, and thus attempts no other route to the destination, although there is a direct link between A and C.

Referring to FIG. 2, a call is made from A.1 to C22 using top-most level DTL (A-C). In peer group C, entry border node C1 (physical node C11) fails to route the call due to insufficient bandwidth on link C11-C12. According to prior art PNNI crankback procedures, entry border node C1 (physical node C11), generates a link blocked crankback (C, 0), since it is in the last LGN in the call's DTL stack. When A.1, the DTL originator, receives this crankback, it interprets that the LGN C is blocked. Since LGN C is the destination LGN, no other routes can be attempted, although route A-B-C is a valid route The above limitations in the PNNI crankback procedures as set out in the PNNI specification are addressed by the present application.

SUMMARY OF THE INVENTION

The invention relates to the field of ATM Networks, particularly to setting up call connections in such networks using the PNNI signaling protocol. Specifically, the invention is directed to PNNI crankback procedures that are used when call routing attempts to a destination Logical Group Node (LGN) fail within this LGN's peer group. The problem is that presently these procedures can lead to blocking of the destination LGN even though other valid paths may exist.

The addition of the destination LGN Blocked crankback procedures to the PNNI crankback procedures enhance the routability of calls and reduce call blocking in the network.

Therefore in accordance with a first aspect of the present invention there is provided a method of routing connections through a data communications network having nodes arranged in a routing hierarchy of respective peer groups, in which a connection is routed between an originating node and a destination node in the hierarchy and a path for the connection, on set up, includes an entry border node in a peer group to which the destination node belongs, the method comprises the steps of; a) determining, in response to a failure to complete the connection between the entry border node and the destination node, whether the entry border node has detected any link blocked crankback message with a succeeding null node ID for the connection, b) and if not, initiating by the entry border node a crankback to a preceding routing-capable node in the path indicating that the link into the peer group is blocked; and c) attempting, at the preceding routing-capable node to route the connection to the peer group over another link.

In accordance with a second aspect of the present invention there is provided a system for routing connections through a data communications network having nodes arranged in a routing hierarchy of respective peer groups, in which a connection is routed between an originating node and a destination node in the hierarchy and a path for the connection, on set up, includes an entry border node in a peer group to which the destination node belongs, the system comprising; means at the entry border node to determine, in response to a failure to complete the connection between the entry border node and the destination node, whether the entry border node has detected any link blocked crankback message with a succeeding null node ID for the connection, and if not, to initiate a crankback to a preceding routing-capable node in the path indicating that the link into the peer group is blocked; and means at the preceding routing-capable node to route the connection to the peer group over another link.

BRIEF DESCRIPTION OF THE DRAWINGS

The invention will now be described in greater detail with reference to the attached drawings.

DETAILED DESCRIPTION OF THE INVENTION

Figure 1:
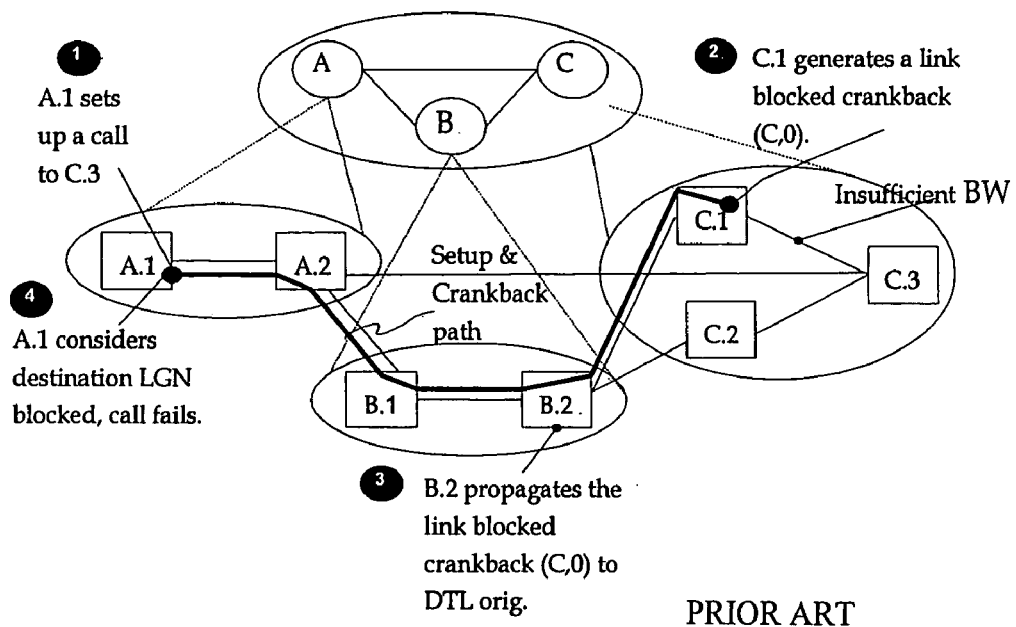
FIG. 1 shows an example of the crankback procedure according to the PNNI specification.

The crankback procedures set out in the PNNI specification have been revised by the crankback procedures of the present invention. These procedures known herein as Destination LGN Blocked crankback procedures are used by entry border nodes in the lowest level destination peer group, entry border nodes in the last LGN of the DTL stack for the call (i.e. entry border nodes in the last LGN not at the lowest level), and DTL originating nodes or routing-capable entry border nodes to make routing decisions based on received crankback information.

The revised Destination LGN Blocked crankback procedures operate according to the following protocol.

An entry border node in the lowest level destination peer group generates a Succeeding End Blocked (SEB) crankback whenever it fails to route the call within the peer group for any reason other than the blocking of the physical destination node to the target address itself. An entry border node knows when a physical node to the target address is blocked in the prior art when it receives a link blocked crankback from the destination node and the crankback contains a link blocked crankback with a null succeeding node Id. The SEB crankback generated by the entry border node will allow the exit border node of the preceding peer group, after following the prior art PNNI crankback procedures, to try other parallel trunk groups entering the destination peer group that may lead to other entry border nodes and more alternate paths. If that fails, the exit border node, using the prior art PNNI crankback procedures, propagates back a link blocked for the uplink between the exit border node and the destination LGN. This will allow the DTL originator or routing-capable entry border nodes to route the call avoiding this link and try other paths into the destination LGN.

For similar failure situations, an entry border node in the last peer group that is not at the lowest level does not generate succeeding end blocked crankback message. Instead, it generates a special destination LGN blocked crankback in order to avoid increasing the call latency time due to attempting parallel trunk groups at higher levels. The purpose of the destination LGN crankback is to signal to the preceding routing-capable node that the failure in the destination LGN was not due to a blocked, lowest level physical destination node but rather due to a failure on the path between the entry node and the destination in the peer group. Thus, another attempt should be made using a different path into that peer group. The destination LGN blocked crankback can be implemented in several different ways. Some of the possible examples include:

1) As a prior art PNNI link blocked crankback with the destination LGN set as the preceding node, a special port Id (0xfffffffe) and a null succeeding node ID
2) As a new crankback with a "Destination LGN" blocking type that contains the node Id of the blocked destination LGN.
3) As a prior art PNNI node blocked crankback with a special flag and the node ID of the destination node.

These examples are not exhaustive and it is to be understood that the invention contemplates any other method of indicating that the destination LGN is blocked so that the preceding, routing capable node can try another link or path into the peer group A DTL originator (or a routing-capable entry border node) treats a "destination LGN blocked" crankback (e.g. implemented as a link blocked crankback with succeeding null node Id and a special port Id (0xfffffffe) as a link blocked between the last node in the DTL at the crankback level in the DTL stack originally transmitted, and the previous to last node in that DTL. Based on that blocked link, the DTL originator (or the routing-capable entry border node) can select a path around that link. This provides a way for routing around blocked entry border nodes in the non-lowest level destination peer group.

Note that if the final destination node is blocked then the prior art crankback procedures are performed, and a link blocked crankback with null succeeding node Id and a zero port Id is generated at the appropriate level. This crankback is propagated backwards towards the DTL originator (or routing-capable entry border nodes), in order to avoid routing to that lowest level physical destination node again.

Figure 3:
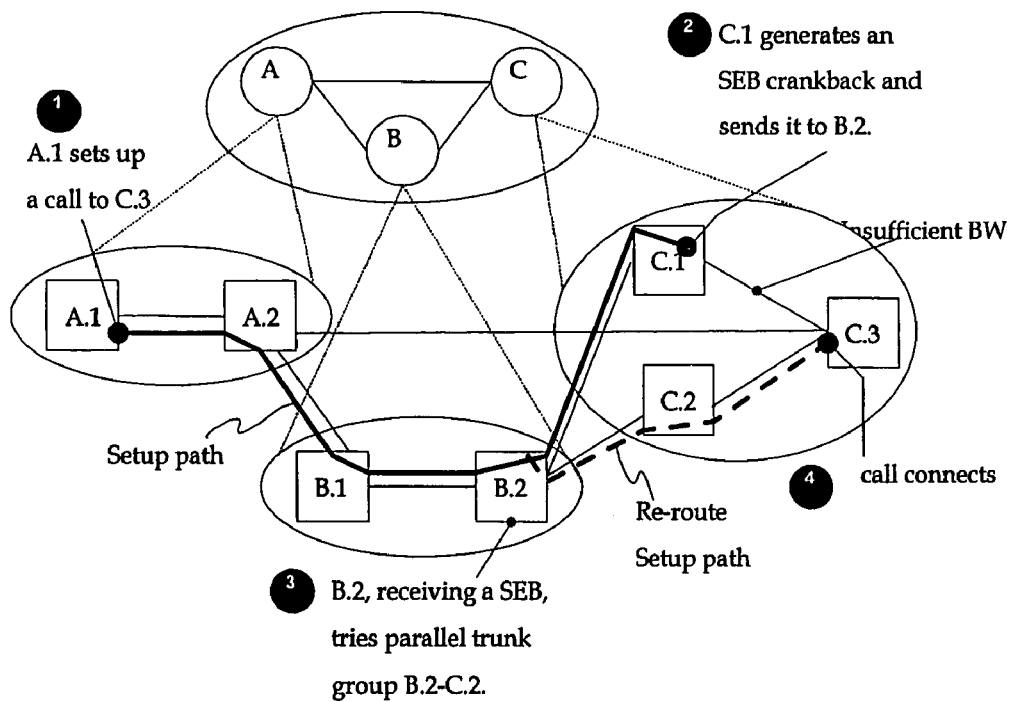
FIG. 3 shows the crankback procedure according to the present invention.

FIG. 3 shows the example of FIG. 1 but with the revised crankback procedures implemented. When A.1 sets up a call to C.3, the call will be blocked at node C.1 due to insufficient bandwidth. Using the Destination LGN crankback procedures of the present invention, C.1 generates a succeeding end blocked crankback. When exit border node B.2 receives this crankback, it will try other parallel trunk groups into the peer group. In this case, B.2 selects the link to C.2 which can successfully establish the call.

In a separate case, if B.2 does not have other parallel trunk groups, it will convert the crankback to link blocked (B.2-C), which will be converted to link blocked (B-C) and propagated to the DTL originator. On receiving this crankback, A.1 will try the A-C route, which may succeed.

Figure 2:
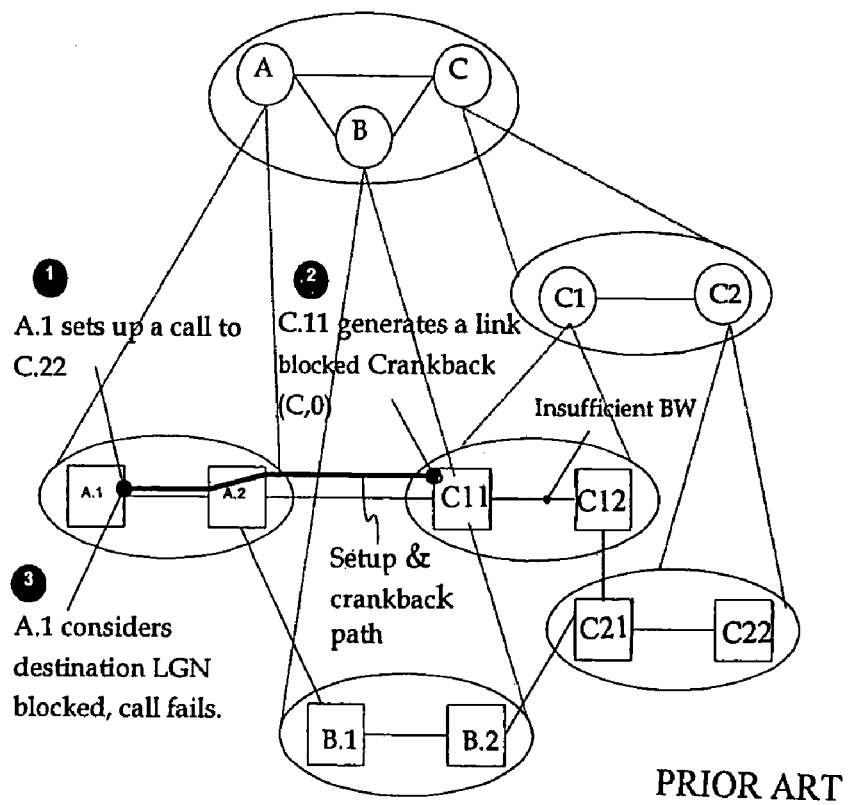
FIG. 2 shows another example of the crankback procedures according to the PNNI specification.
Figure 4:
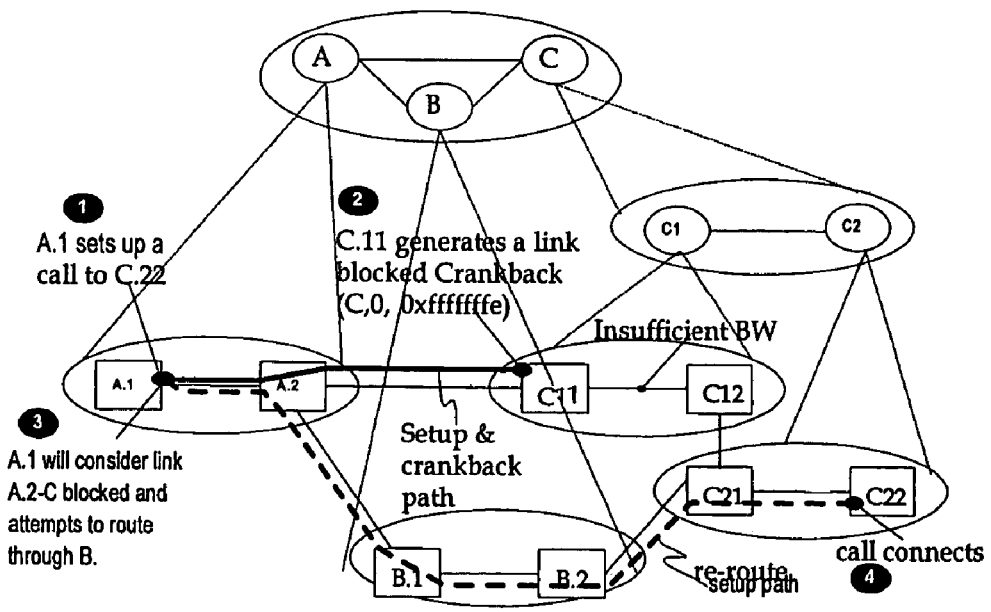
FIG. 4 shows another example of the crankback procedures according to the present invention.

FIG. 4 illustrates the example of FIG. 2 but again with the revised crankback procedures implemented. When A.1 sets up a call to C.22, the call will block at node C.11. Using the Destination LGN Blocked crankback procedures, C11 generates a, link blocked crankback (C, 0, port_id), where the port_id is a non-zero special port Id value (0xfffffffe). When this crankback is received by the node A.1 the special port_id value causes it to interpret that the link A-C is blocked, and thus node A.1 attempts a re-route on A-B-C.

In summary, the present invention provides a solution to a problem in the PNNI standard that can cause call connection failures due to resource exhaustion on selected paths when, in fact, sufficient resources exist for the call on other valid paths. The problem can manifest itself in both simple and complex networks, and typically in cases where a large SPVC re-routes have occurred. The solution provided by this invention will help a user maximize network resources.

An alternative to this solution is to over-provision a network. However, to do so requires more money/equipment/configuration/etc. to ensure that there is always sufficient bandwidth so that all entry border nodes can reach all destination nodes. This would be a very costly alternative to use and if this alternative is already in place, the present invention can provide a significant cost savings by relinquishing the equipment used for over-provisioning, thereby allowing it to be used for other purposes.

Although particular embodiments of the invention have been described and illustrated it will be apparent to one skilled in the art that numerous changes can be made without departing from the inventive concept. To be understood, however, that such changes will fall within the full scope of the invention as defined.

We claim:

1. A method of routing connections through a data communications network having nodes arranged in a routing hierarchy of respective peer groups, in which a connection is routed between an originating node and a destination node in the hierarchy and a path for the connection, on set up, includes an entry border node in a peer group to which the destination node belongs, a failure to complete a connection between the entry node and the destination node having been detected, the method comprising the steps of:

a) determining whether the entry border node has detected any link blocked crankback message with a succeeding null node ID for the connection, b) if a link blocked crankback message with a succeeding null node ID for the connection has not been detected, initiating by the entry border node a crankback message to a preceding routing-capable node in the path indicating that the link into the peer group is blocked; and c) attempting, at the preceding routing-capable node to route the connection to the peer group over another link.

2. The method as defined in claim 1 wherein when the entry border node is in the same peer group as the destination node at the lowest level in the routing hierarchy the initiated crankback message is a succeeding end blocked (SEB) message.

3. The method as defined in claim 1 wherein when the entry border node is in the same peer group as the destination node but not at the lowest level in the routing hierarchy, the initiated crankback message is a destination Logical Group Node (LGN) blocked crankback.

4. The method as defined in claim 3 wherein the destination LGN blocked crankback has succeeding null node ID and a special port ID.

5. The method as defined in claim 3 wherein the destination LGN blocked crankback is a message to signal to the preceding routing-capable node that the link into the destination LGN is blocked.

6. The method as defined in claim 5 wherein the destination LGN blocked crankback is a link blocked crankback with the destination LGN as the preceding node ID, a special port ID (0xfffffffe) and a null succeeding node ID.

7. The method as defined in claim 4 wherein the destination LGN blocked crankback is a crankback with a destination LGN blocking type and the node ID of the destination LGN.

8. The method as defined in claim 4 wherein the destination LGN blocked crankback is a node blocked crankback with a special flag and the node ID of the destination LGN.

9. The method as defined in claim 4 wherein the entry border node signals special crankback information to indicate that the destination LGN is blocked so that the preceding routine-capable node can select a different link into the destination LGN.

10. The method as defined in claim 1 wherein the routing hierarchy is implemented using a PNNI (Private Network Node Interface or Private Network Network Inteface) protocol.

11. The method as defined in claim 10 wherein said data network carries ATM traffic.

12. A system for routing connections through a data communications network having nodes arranged in a routing hierarchy of respective peer groups, in which a connection is routed between an originating node and a destination node in the hierarchy and a path for the connection, on set up, includes an entry border node in a peer group to which the destination node belongs, a failure to complete a connection between the entry node and the destination node having been detected, the system comprising:

means at the entry border node to determine whether the entry border node has detected any link blocked crankback message with a succeeding null node ID for the connection, and if not, to initiate a crankback message to a preceding routing-capable node in the path indicating that the link into the peer group is blocked; and means at the preceding routing-capable node to route the connection to the peer group over another link.

13. The system as defined in claim 12 wherein when the entry border node is in the same peer group as the destination node at the lowest level in the routing hierarchy the initiated crankback message is a succeeding end blocked (SEB) message.

14. The system as defined in claim 12 wherein when the entry border node is in the same peer group as the destination node but not at the lowest level in the routing hierarchy, the initiated crankback message is a destination Logical Group Node (LGN) blocked crankback.

15. The system as defined in claim 14 wherein the destination LGN blocked crankback is a message to signal to the preceding routing-capable node that the link into the destination LGN is blocked.

16. The system as defined in claim 15 wherein the destination LGN blocked crankback is a link blocked crankback with the destination LGN as the preceding node ID, a special port ID (0xfffffffe) and a null succeeding node ID.

17. The system as defined in claim 14 wherein the destination LGN blocked crankback is a crankback with a destination LGN blocking type and the node ID of the destination LGN.

18. The system as defined in claim 14 wherein the destination LGN blocked crankback is a node blocked crankback with a special flag and the node ID of the destination LGN.

19. The system as defined in claim 14 wherein the entry border node signals special crankback information to indicate that the destination LGN is blocked so that the preceding routing-capable node can select a different link into the destination LGN.

20. The system as defined in claim 12 wherein the routing hierarchy is implemented using a PNNI (Private Network Node Interface or Private Network Network Inteface) protocol.

* * * * *